B. B. LOAR.
Gage for Fitting Watch-Crystals.
No. 159,336.  Patented Feb. 2, 1875.
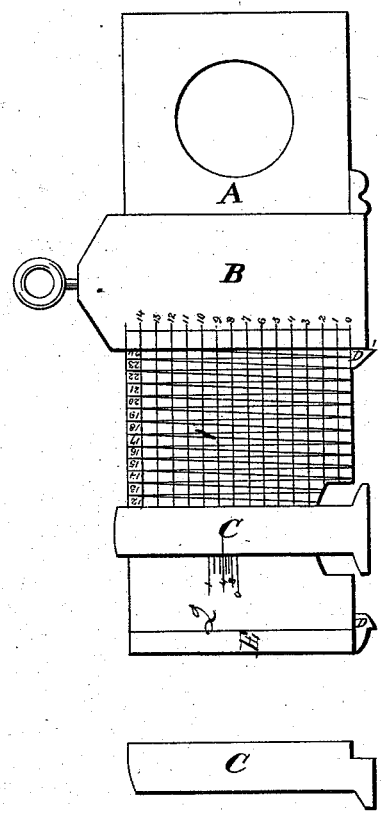
Witnesses
W. H. Sedgwick
Geo. H. Webster
Inventor.
Benjamin B. Loar

UNITED STATES PATENT OFFICE.

BENJAMIN B. LOAR, OF GRANVILLE, OHIO.

IMPROVEMENT IN GAGES FOR FITTING WATCH-CRYSTALS.

Specification forming part of Letters Patent No. 159,336, dated February 2, 1875; application filed October 17, 1873.

*To all whom it may concern:*

Be it known that I, BENJAMIN B. LOAR, of the village of Granville, in the county of Licking and State of Ohio, have invented an Improvement in Gages for Fitting Watch-Crystals, of which the following is a specification:

The object of my invention is to determine, by one application and adjustment of the instrument, the exact diameter and convexity of crystal needed for any watch whatever, in terms of the standard gage, according to which all glasses, American or Swiss, are labeled.

My invention consists of the plate A having the point D, in combination with the sliding piece B having point D', and the bar C sliding in a direction at right angles to the line of motion of the piece B. The plate A has a fixed foot, D, which fits into the groove of the bezel of a watch-case. The adjustable slide B or its equivalent has a similar foot, which fits in like manner into the groove of the bezel at a point diametrically opposite.

For Genevan glasses, if the size needed be a whole number, it is read at the top of that vertical line of gage 1 on A, with which the edge of slide B will, in that case, coincide; if it be fractional the integral part is read at the top, as before, and the fractional part on that one of the horizontal lines of slide B which runs through the point at which the edge of the slide meets the diagonal of the scale.

For American glasses the sizes are read, in like manner, on the back of plate A. In order to this, and for other purposes, slide B slips over plate A, and is held in position by a small steel spring in the top of the slot, which is fastened by the small thumb-screw projecting above.

The convexity, numbered 1 2 3 4 5 6 7 8 on the glasses, is obtained by slide C, which moves freely at right angles to the line of motion of slide B, and is so set as to come down upon the hand-post of the watch. On the line of gage 2 on plate A, which then coincides with the fixed horizontal line on C, is then read the proper height of crystal. For watches of very small size a second slide, C, with narrow base is used to allow room for the working of the adjustable foot D' on slide B. Plate A has a shoulder, E, on front and back, in view of the slight variations that exist in glasses of the same marked number, and is convenient for those who wish to fit glasses into the gage in order to secure perfection before setting them into the bezel, or to select glasses from such as have lost their numbers.

I claim as my invention—

The plate A having the point D, in combination with the sliding-piece B having point D', and the bar C sliding in a direction at right angles to the line of motion of the piece B, in combination with standard measures for the purposes herein substantially set forth.

BENJAMIN B. LOAR.

Witnesses:
 W. H. SEDGWICK,
 GEO. H. WEBSTER.